Feb. 9, 1960  A. Y. DODGE  2,924,300
WHEEL BRAKES FOR VEHICLES
Filed Oct. 22, 1954  2 Sheets-Sheet 2
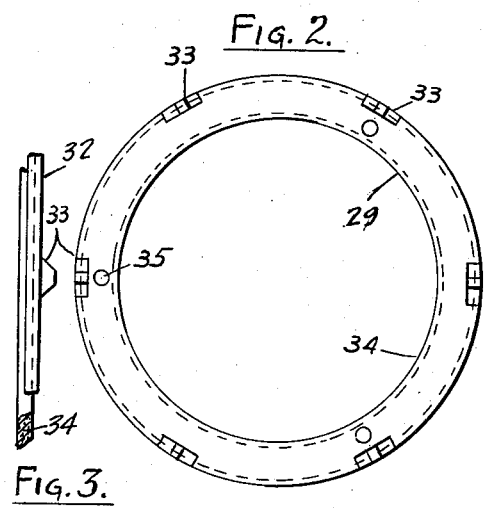
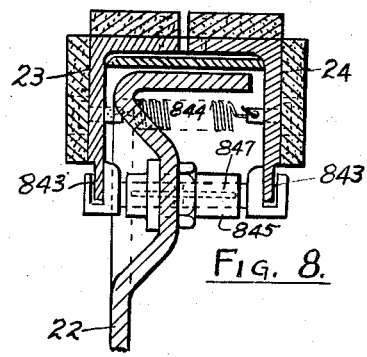
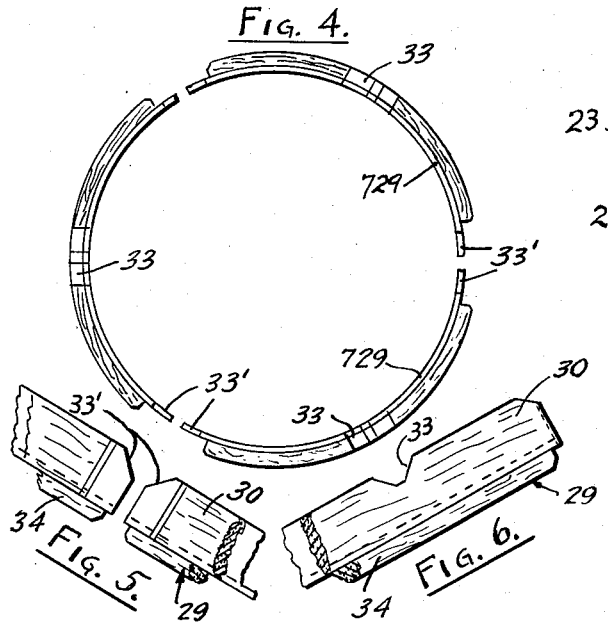
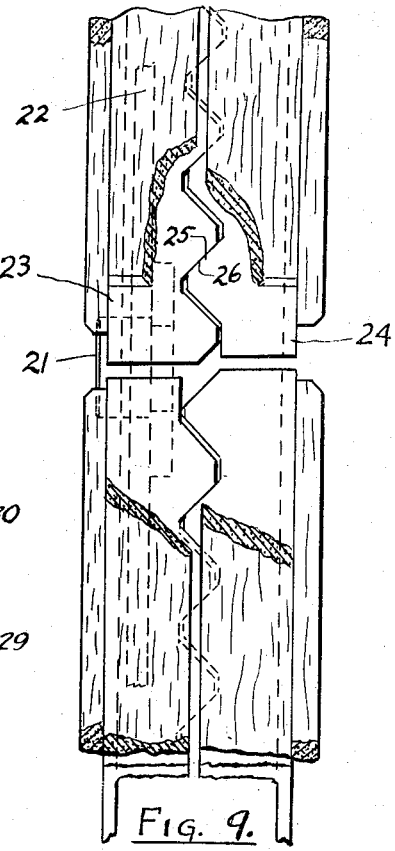
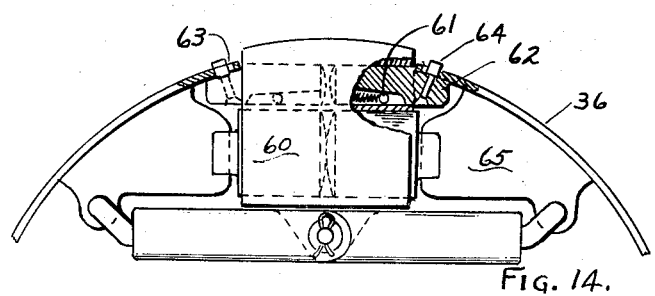
INVENTOR.
Adiel Y. Dodge

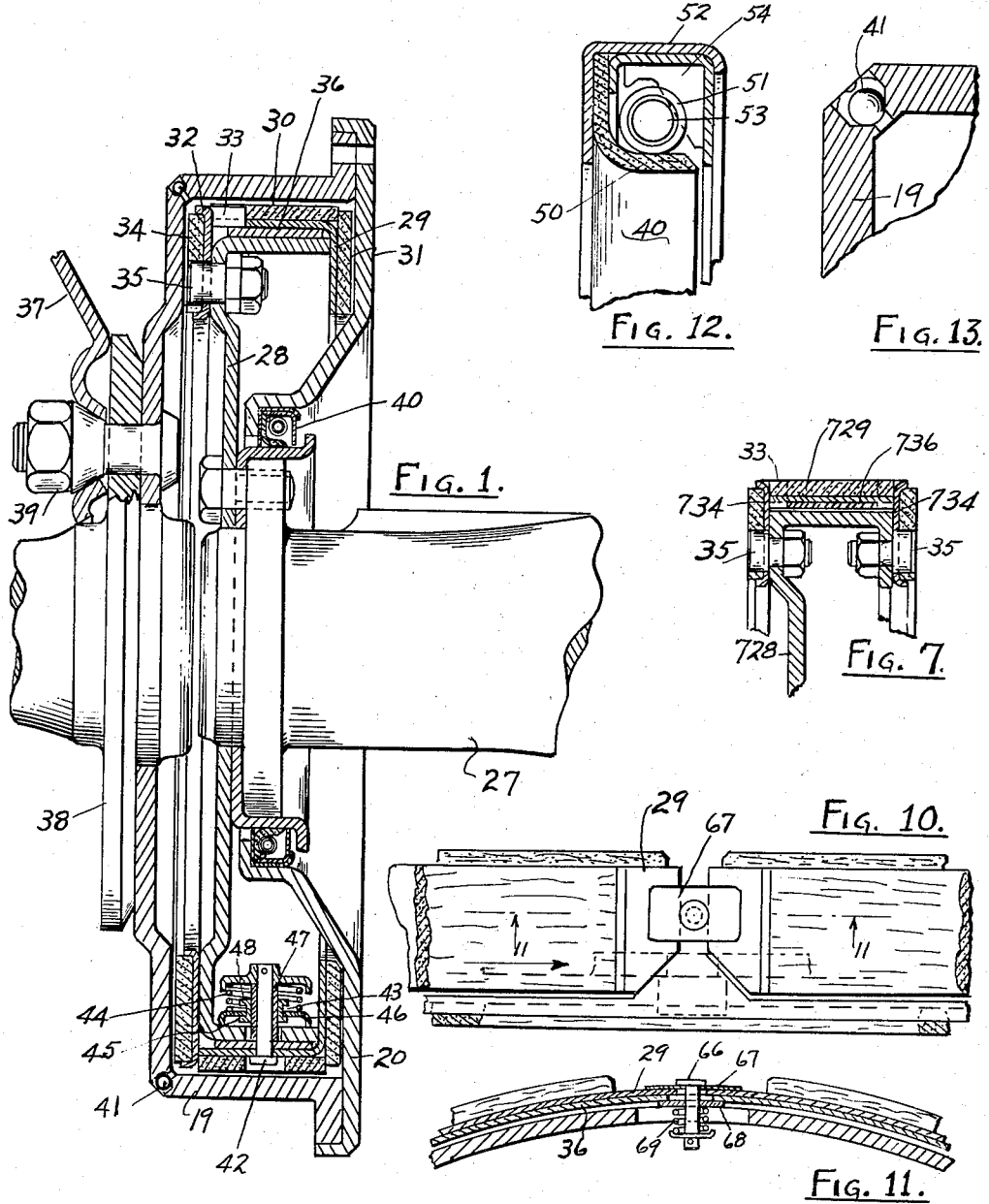

United States Patent Office 2,924,300
Patented Feb. 9, 1960

2,924,300

WHEEL BRAKES FOR VEHICLES

Adiel Y. Dodge, Rockford, Ill.

Application October 22, 1954, Serial No. 464,121

3 Claims. (Cl. 188—70)

The objects of this invention are to provide a brake more suitable for high-speed vehicles, a brake more suitable for converting kinetic energy into heat at high speeds, a brake dissipating less than one-half the amount of heat energy per square inch of braking area, a brake producing more uniform distribution of pressure over the brake line, a brake having increased life of more than twofold for a given diameter, width size.

One of the chief objects of my invention is to provide a brake combining the good qualities and characteristics of both an internal shoe brake and a disc brake—a brake which increases the lining surface more than twofold over that commonly employed per unit of drum diameter.

A further object of this invention is to provide a commercially acceptable, completely sealed brake, one which does not become wet when fording a stream.

A further object is to relieve the seal at high speeds by employing centrifugal force to bring about the release thereof.

A still further object is to provide a brake having a large measure of self-actuation, but of a character more nearly straight-line; one which varies more nearly directly proportionally to the change in the coefficient of friction as against a self-actuating brake which varies according to angular wrap or as $[(2.718)^{u\theta}]-1$. $u$=coefficient of friction, and $\theta$=radians of wrap, or its equivalent.

I attain these objects and others as will be apparent from the following description and drawings, in which:

Figure 1 is a fragmentary elevation in section showing parts of a rear axle, wheel hub, wheel, brake drum, and brake;

Figure 2 is a side elevation of the disc portion of the brake shown in Figure 1;

Figure 3 is a fragmentary projection viewed from the left side of Figure 2;

Figure 4 shows an end elevation of brake shoes in place;

Figures 5 and 6 are fragmentary projections showing side views of Figure 4;

Figure 7 is a general cross section of an alternative construction of the brake elements;

Figure 8 is a general cross section of another alternative construction;

Figure 9 is a fragmentary plan view looking down on the periphery of the brake illustrated in Figure 8;

Figure 10 is also a fragmentary plan view showing a shoe return means;

Figure 11 is a fragmentary section taken on line 11—11 through Figure 10;

Figure 12 shows a fragmentary cross section of the seal employed in Figure 1;

Figure 13 shows a fragmentary detail of the relief valve shown in Figure 1;

Figure 14 shows a side elevation of a hydraulic wheel cylinder and automatic adjusting means associated therewith.

As will be seen from the foregoing drawings, this brake might be termed a combined internal shoe brake and a disc brake. As shown in the general cross section in Figure 8, each shoe is provided with brake lining on its side face as well as on its peripheral cylindrical surfaces. Ways and means are provided which will be described later to expand the brake circumferentially and at the same time to spread it axially so that frictional contact is made on the two side faces lying at right angles to the cylindrical surface where frictional contact is also made.

In order to provide three braking surfaces for the three lining surfaces to work against, my brake drum has a flat disc surface at right angles to its internal cylindrical surface. In addition thereto, the drum is provided with a cover 20, securely fastened to the drum and presenting a disc surface parallel to the aforementioned disc surface and spaced therefrom sufficiently wide to provide the necessary space for the brake shoe elements.

In the arrangement shown in Figure 9, fixed abutments 21 are secured to a mounting plate 22, and are engageable with brake shoes 23 in a manner to prevent angular rotation thereof about the main axis but to permit radial expansion of the brake shoes 23 to make contact with the cylindrical surface of the drum and also permit axial movement of the brake shoe members. Opposite to the brake shoes 23 are other brake shoe members 24 connected to the first mentioned brake shoe members 23 by means of axially facing cam surfaces 25 and 26 such that any braking force absorbed in brake shoe members 24 tending to cause relative rotation of shoes 23 and 24 cause an axial spreading action between the brake shoe members 23 and 24, thereby to produce axial side thrusts to create braking action on the disc surfaces. All of the braking action, both on the cylindrical surfaces and the disc surfaces of the brake shoe members 24 are transmitted through the cam members 25 and 26 into the brake shoe members 23, and eventually delivered to the abutment 21 of brake shoe member 23.

I have now recited the fundamental principles involved and will describe the parts and their functions in more detail, referring first to Figure 1.

In Figure 1, a fragment of rear axle is shown at 27. Secured thereto is a mounting plate 28 having a peripheral flange on which is loosely supported an array of brake shoes 29 which have cylindrical surfaces 30 overlying the flange on the mounting plate and disc surfaces 31 parallel to the cover plate 20. These shoes 29 contact disc 32 through cams 33 formed by tapered projections on the disc 32 fitting into complementary notches in the cylindrical portion 30 of shoes 29. Disc 32 is anchored at abutment pins 35. Cams 33 and holes for abutment 35 carried by the plate 28 and extending through holes in the disc 32 to hold it against rotation but to permit axial movement thereof can be best seen in Figures 2 and 3.

Disc 32 is provided with brake lining 34. Brake shoes 29 are expanded by a control band 36 explained more fully in my Patents 1,994,813 and 2,263,263.

The brake members are located within a brake drum 19 having a cover 20 secured thereto. A fragment of a disc wheel is shown at 37, secured to flange 38 by wheel bolts and nuts 39. Drum 19 and drum cover 20 form a closed compartment being sealed by seal 40. Seal 40 is a special seal which will be described later.

Drum 19 is also provided with two relief valves 41, best seen in Figure 13. The purpose of the relief valve is to discharge brake lining dust and any other foreign matter which might find its way into the drum enclosure, including any water which may leak in inadvertently.

In operation of this brake the parts normally occupy the position shown in Figure 1 in which the arcuate flange portions 30 of shoes 29 are spaced from the web of the drum and the disc portions 31 and 34 are spaced from the flange of the drum and from the cover plate. To apply the brake the operating band 36 is expanded to force the shoes 29 radially outward and engage the flange surfaces 30 with the web of the drum. Frictional drag of the drum on these flange surfaces tends to turn the shoes 29 with the drum and causes relative rotation between the shoes 29 and disc 34 which is held against rotation by the abutment pins 35. Through action of the cam means 33 the disc 34 and the shoes 29 are moved axially away from each other to bring the disc 34 into engagement with the flange of the drum and to shift the disc portions 31 of the shoes 29 into engagement with the cover plate 20. Thus all of the friction surfaces are simultaneously effective to resist rotation of the drum and the disc portions of the brake are actuated through the friction drag exerted on the flanges 30 of the shoes to produce a highly efficient braking effect with a minimum of braking effort.

This brake differs somewhat from the brakes shown in Figures 8 and 9 in that disc 32 and lining 34 replaces the disc portion of brake 23. Disc 32 is shown in detail in Figures 2 and 3. Disc 32 and its lining 34 form one continuous disc having recesses to communicate with three anchor pins 35. Disc 32 also has six cams 33, which are acted upon by the cam surfaces in shoe 29. This construction has certain advantages over and above the construction shown in Figures 8 and 9 although it is less symmetrical.

As a further modification, I have shown a general section in Figure 7 employing a right hand and left hand disc 734 with suitable arcuate shoes 729 interposed between the discs. Discs 734 may be identical to disc 32 as previously shown and are connected to the shoes 729 through cams 33 in the same manner. This arrangement provides a symmetrical brake in which both the right hand and left hand discs 734 are anchored at 35 and are provided with cams 33, to be actuated by the tangential force imposed by braking upon shoes 729. This arrangement provides a self actuation, having nearly straight-line characteristics as to self actuation increase caused by increase in the coefficient of friction.

This brake is applied by expanding shoes 729 into engagement with the brake drum through an operating band 736. Tendency of the shoes to turn with the drum cams the discs 734 outward into engagement with disc surfaces on the drum through the cams 33.

The arrangement of the shoes 729 of Figure 7 is best shown in Figure 4 wherein three shoes arranged in end-to-end relationship to form an annular assembly is illustrated. As shown, each shoe is formed intermediate its ends with a cam notch 33 to cooperate with complementary cam projections on the discs 734 and the shoes are free to move circumferentially with the drum in the absence of abutments. Additional cam surfaces may be provided at the ends of the shoes as illustrated at 33' to cooperate with cam projections on the discs.

The shoes 29 of Figure 1 are similarly shown in Figures 5 and 6. As there illustrated, each shoe is formed intermediate its ends with a cam notch 33 and is tapered at its ends as illustrated at 33' to provide additional cam surfaces for cooperation with cam projections on the disc 32.

In these various embodiments, I have illustrated a wheel brake which is expansible in three directions: expansible to the right and to the left axially and radially. By expanding the set of cylindrical segment members radially, a braking action is set up. Braking action creates tangential forces. Said tangential forces are utilized to expand brake members to the right and to the left by action through cam members 33 and 33'.

Certain members such as 23 or 32 are abutted to the mounting plate while other members such as 24 and 29 communicate with the first abutting members, through cam members 25—26 or 33—33'.

I have provided a special seal member which relieves itself of contact and friction as speed increases. One very simple means for constructing such a seal is set forth in Figure 12. In Figure 12, I have employed parts commonly used in oil seals; namely, a seal member 50 which may be leather or a resilient composition material held in contact with a sealing surface by garter spring 51, suitably housed in a housing 52 in a usual manner.

A special feature of this seal lies in the fact that I have placed weighty pellets 53 inside of the garter spring such that revolution of the assembly will set up centrifugal force in the pellets 53, thereby relieving the load of the garter spring on the sealing member 50.

So that garter spring 51 will not have a tendency to swirl around relative to the seal member 50 and thereby chafe it, I have provided gusset members 54, secured to the inner portion of the housing 52 and arranged to overlap and lie between the coils of garter spring 51 in a manner which will permit garter spring 51 to expand as previously described. This prevents garter spring 51 from appreciable angular motion relative to part 50.

In this way, I have provided a seal which will move out of contact with the running surface at high speeds, thereby eliminating wear and friction and heat, although the seal is relatively large in diameter.

I wish to point out that the seal is unnecessary at high speeds since the structure shown will carry away by centrifugal force any water seeking entrance into the closure. Seal 40 is pressed into member 20 and turns therewith, thus providing substantially a nearly continuously revolved surface exposed to splash, or a sealed joint when stationary or moving slowly.

The control members set forth in this disclosure comprise an expanding control band 36, as more fully set forth in my Patents 1,994,813 and 2,263,263. This control band may be expanded by a hydraulic cylinder such as is shown in Figure 14, in which 60 indicates a more or less conventional wheel cylinder having pistons to be expanded by hydraulic pressure. Associated with the cylinder is an automatic spacer provided with one way escapements which may be in the form of rollers 61 to permit rod member 62 to move outwardly from the center, but to prevent their returning. Joints 64 are provided with lost motion connections 63, connecting them to band 36. Webs 65 are shown welded to the control band 36. The lost motion at 63 allows control bands 36 to contract to provide the necessary radial clearance; for more detailed description, see my Patent 2,596,380.

In addition to this actuating means, I have shown an automatic clearance adjuster in Figure 1 at 42. This automatic clearance adjuster is more fully described in my recently issued Patent Number 2,508,105.

Briefly, a pre-determined amount of clearance exists at 43. Spring 44 pulls the shoe inward radially until clearance 44 is consumed. That is, shoulder 45 contacts disc member 46 which is secured to the mounting plate 28 by means, not shown. Friction exists between split tubes 47 and disc member 48. The amount of friction being sufficient so that about twice the force is required to bring about movement between 47 and 48 as is the force exerted by spring 44. Automatic clearance adjusters 42 are employed in sufficient numbers and spaced at least one to each shoe member.

At the ends of each shoe may be employed a return spring, urging the shoes 29 and control band 36 together. Thus the contraction of control band as previously described renders a force to contract shoes 29 radially also.

The parts shown in Figures 10 and 11 are a spring 69 encompassing a pin 66 setting up a force to bring washers 67 and 68 toward each other. Washers 67 and 68 overlap the ends of shoes 29 and control band 36, thus to urge them together.

It might be mentioned here that the girling principle works to assist the maintenance of necessary clearance in this brake when equipped as described.

It should be apparent that manual adjusters may be employed instead of automatic clearance adjusters. While I have shown and described one method of expanding and contracting my brake, it should be apparent that other methods might readily be used such as the means set forth in my Patent 2,590,690.

An inflatable tube might be used instead of my control band 36, very much as was taught by Linderman in his Patent 1,786,438.

Having thus described my invention in two or three embodiments, I wish to point out that an expansible brake, expansible in three dimensions may be arranged in other manners besides those disclosed and that the scope of my invention is limited only by the following claims.

I claim as my invention the following:

1. A brake comprising a rotatable annular drum of channel section opening inwardly, a stationary support adjacent to the drum, a plurality of brake members, means for mounting the brake members on the support within the drum for radial and axial movement relative to each other into engagement with the drum, each of the brake members having a flat disc portion and at least one of the brake members having an arcuate shoe portion rigidly connected with the flat disc portion, the flat disc portions of the brake members being axially opposed and the brake members being movable on the mounting means axially to bring the disc portions into engagement with the flanges of the drum respectively and radially to bring the arcuate shoe portion into engagement with the web of the drum, respectively, cam means interconnecting the brake members to urge them axially away from each other to move the disc portions axially into engagement with the flanges of the drum, abutment means on the support engaging one of the brake members to limit turning thereof relative to the support and operating means to urge another of the brake members radially outward into engagement with the web of the drum.

2. A brake comprising a rotatable annular drum of channel section opening inwardly, a stationary support adjacent to the drum, a pair of brake members, means mounting the brake members on the support within the drum for radial and axial movement into engagement with the drum, each of the brake members having an arcuate flange movable radially on the mounting means to engage the web of the drum and a flat disc portion connected to the arcuate flange and movable axially on the mounting means to engage a flange of the drum, cam means interconnecting the flanges of the brake members to urge the brake members axially apart upon relative rotation thereof, abutment means on the support engaging one of the brake members to limit rotation thereof relative to the support, and operating means to move both of the brake members radially into engagement with the web of the drum.

3. The brake of claim 1 in which one of the brake members includes connected flat disc and arcuate shoe portions and the other brake member comprises a flat disc portion only and engages the abutment.

References Cited in the file of this patent
UNITED STATES PATENTS

| | | |
|---|---|---|
| 1,505,216 | Myrick | Aug. 19, 1924 |
| 1,603,963 | Liebowitz | Oct. 19, 1926 |
| 1,858,973 | Steele | May 17, 1932 |
| 1,906,733 | Bendix | May 2, 1933 |
| 1,930,708 | Cunningham | Oct. 17, 1933 |
| 1,956,315 | Collins | Apr. 24, 1934 |
| 1,989,179 | Versluis | Jan. 29, 1935 |
| 2,020,809 | Stock | Nov. 12, 1935 |
| 2,050,902 | Tatter | Aug. 11, 1936 |
| 2,057,422 | Dickson | Oct. 13, 1936 |
| 2,065,382 | Levy | Dec. 22, 1936 |
| 2,263,079 | Flynn | Nov. 18, 1941 |
| 2,344,933 | Lambert | Mar. 21, 1944 |
| 2,371,503 | Carter | Mar. 13, 1945 |
| 2,595,860 | Lambert et al. | May 6, 1952 |
| 2,602,525 | Jurgens | July 8, 1952 |
| 2,629,473 | Vincent | Feb. 24, 1953 |

FOREIGN PATENTS

| | | |
|---|---|---|
| 707,074 | Germany | June 12, 1941 |